UNITED STATES PATENT OFFICE.

WILLIAM H. BARKER, OF WEST FARMS, NEW YORK, ASSIGNOR TO WILLIAM R. WINSLOW, OF SAME PLACE.

IMPROVEMENT IN MEDICAL COMPOUNDS OR FEVER AND AGUE REMEDIES.

Specification forming part of Letters Patent No. 127,014, dated May 21, 1872.

*To all whom it may concern:*

Be it known that I, WILLIAM H. BARKER, of West Farms, in the county of Westchester and State of New York, have invented a Compound for the Relief or Cure of Fever and Ague; and the following is declared to be a correct description of the same.

By practically using and testing the compound herein referred to, I have discovered that the substances named and taken as specified are a reliable cure for fever and ague, and that they promote the general health of the person.

I make use of forty grains of quinine, forty to sixty drops of elixir of vitriol, one tablespoonful of African capsicum, mixed in about a quart of water.

It is preferable that these substances should be bottled, and then taken in doses adapted to the age and constitution of the individual.

For an adult a wine-glassful three times a day is a proper dose. When about a pint of this medicine has been taken in this manner the strength of the mixture is lessened by diluting with an equal quantity of water.

The proportion for children will vary according to age and constitution, and the mixture may be diluted with water or any substance to render it more palatable; in all cases it is better to lessen the dose after the fifth or sixth day.

I claim as my invention—

The compound herein specified as a relief for fever and ague.

Signed by me this 21st day of September, A. D. 1871.

WM. H. BARKER.

Witnesses:
LEMUEL W. SERRELL,
GEO. T. PINCKNEY.